(12) United States Patent
Green (10) Patent No.: US 7,218,574 B2
(45) Date of Patent: May 15, 2007

(54) HIGH RANGE RATE SIGNALING (75) Inventor: Maurice D. Green, North Falmouth, MA (US)

(73) Assignee: Teledyne Benthos, Inc., North Falmouth, MA (US)

( * ) Notice: Subject to any disclaimer, the term of this patent is extended or adjusted under 35 U.S.C. 154(b) by 178 days.

(21) Appl. No.: 10/991,765

(22) Filed: Nov. 18, 2004

(65) Prior Publication Data

US 2005/0111588 A1    May 26, 2005

Related U.S. Application Data

(60) Provisional application No. 60/525,558, filed on Nov. 26, 2003.

(51) Int. Cl.
*H04B 11/00* (2006.01)

(52) U.S. Cl. ........................... 367/134; 340/850

(58) Field of Classification Search ............... 367/134, 367/901; 340/850
See application file for complete search history.

(56) References Cited

U.S. PATENT DOCUMENTS

| 3,868,622 A | 2/1975 | Knott |
| 4,203,164 A | 5/1980 | Isaak et al. |
| 5,784,339 A | 7/1998 | Woodsum et al. |

OTHER PUBLICATIONS

Collin, et al., "Doppler-Sensitiveactive Sonar Pulse Designs for Reverberation Processing", IEE Proc.-Radar, Sonar Navig., vol. 145, No. 6, Dec. 1998.
PCT/US2004/39120, Search Report and Written Opinion, mailed Aug. 30, 2006.

*Primary Examiner*—Ian J. Lobo
(74) *Attorney, Agent, or Firm*—Francis J. Caufield (57) ABSTRACT

An underwater communications method and apparatus is provided for demodulating communications signals while compensating for the effects of range rate, i.e., relative velocity between the nodes of the communication system. The method of the invention is implemented in the DSP of an underwater bi-directional acoustic modem and method comprises the steps of generating a communication signal with an acquisition component for providing an initial estimate of the range rate. The acquisition component preferably is with a nonlinear frequency modulated acquisition component, preferably in the form of a hyperbolic frequency modulated signal, for providing the initial estimate of the range rate. Following this, a second set of signals, preferably a set of single frequency tonals, is generated and acquired using the initial estimate of range rate to obtain a more precise estimate of range rate. The communication signal is then demodulated using the more precise estimate of range rate to compensate for the effects of range rate on the communication signal so that the communication signal appears to have not been influenced by the effects of range rate.

5 Claims, 4 Drawing Sheets

HIGH RANGE RATE SIGNALING

CROSS-REFERENCE TO RELATED APPLICATION

This application claims the benefit of priority from U.S. Provisional Patent Application No. 60/525,558 filed on Nov. 26, 2003 with the title HIGH RANGE RATE SIGNALING, the entire contents of which are incorporated herein by reference.

FIELD OF THE INVENTION

This invention in general relates to underwater communications and in particular to a signal component for use in underwater communications via acoustic modem to provide acquisition and alignment of signals between transmission and receiving nodes that are rapidly moving (20 or more knots) with respect to one another.

BACKGROUND AND INVENTION

Modems were developed to allow computers to exchange information over a network of telephone lines. To process information, a computer reduces data to a digital format of 1's and 0's, representing the two values by either the presence or absence of an electronic signal. The modem, which is short for modulation/demodulation, converts this digital representation to sounds which, in turn, are coded by the telephone lines as electrical signals. In this modulated or analog format, the digital 1's and 0's are represented by different frequencies within a defined bandwidth. At the receiving end of the transmission, another modem converts the signal from frequency form back to digital form so that the data can be accepted and processed by the receiving computer.

The key performance parameter for a modem is its data transfer rate, which is usually measured by baud rate, or the number of bits per second the modem can reliably generate and receive. Baud rates of 28,800 and 56,600 are now commonplace in PC communications.

On land, the medium between modems is the benign environment of a shielded wire or the sharply defined path of a microwave transmission. In these environments, it is relatively easy to achieve fast and reliable transmission of large amounts of data. Without much interference, the discrete signals can be sent out in very close proximity and still be properly understood at the receiving end. And, as signals begin to fade over distance, network facilities recondition the signals so that they arrive in a clear, unambiguous form.

Unfortunately, in many underwater applications, a wire connection with submerged instrumentation is either prohibitively expensive or not feasible. The solution is to use the water itself as the medium for the transmission of acoustic signals. However, this solution presents several problems. First, sound travels through water at a much slower speed—approximately 1,500 meters per second—compared to electrical transmissions on a phone line, which travel at the speed of light.

Secondly, the water is an open channel into which the acoustic signal is broadcast. Even when the transmission is a narrow beam aimed at its target, the sound wave fans out and generates echoes which arrive at the target destination shortly after the original signal. These multipath echoes require additional processing as the signal is received.

The open-channel broadcast also results in the need for additional signal processing with each transmission to assure that the target, and only the target, receives the message. Finally, water can be a much more hostile environment. The signal is affected by changes in water temperature, turbulence, objects in the water and a host of other factors, including any relative motion between communication nodes.

With any wireless communications system provisions must be made to accommodate rapid relative velocity between transmitters and receivers of the system. This is especially true of underwater communications, which have relatively limited bandwidths and otherwise difficult channels. All communications signals contain components used for acquisition and alignment, where, in the broadest sense, alignment pertains to both the temporal and spectral identification of the modulated portion of the larger signal. A typical signal component is a linear frequency modulated (LFM) waveform (also known as a chirp). This is processed with a "matched filter" technique using as a filter an exact replica of the transmitted LFM. The peak of the filtered output indicates the arrival time of the signal. When relative velocity (i.e., range rate) occurs, the waveform is distorted by temporal compression or dilation, which also has the effect of compressing/dilating the spectral content of the waveform. In this case, the basic filter is no longer a good "match" for the received signal. The distortion causes a decrease in the peak filtered response, as well as loss of precision in estimation of temporal alignment. Furthermore, the level of spectral distortion of the signal is not revealed. The issue here is to develop an acquisition/synchronization subsystem which can provide acquisition of a packet and provide satisfactory alignment with the modulated message over a wide span of range rates. At the same time the acquisition must provide initial estimation of the range rate so the remainder of the signal can be corrected to enable the demodulation to proceed as if there were no motion present.

The classic method for solving this problem is to form a multi-hypothesis, maximum likelihood estimator, wherein a "bank" of filters are formed, each reflecting a different hypothesis of range rate. The number of filters used must account for the degree of spectral distortion imposed by the motion. Typically, a new filter must be used when the adjacent filter peak is reduced by 50%. The system then observes all of the filtered outputs and chooses that one with the largest peak. This "best" choice of filter then determines the range rate, which can then be used to correct the remainder of the signal for the imposed spectral distortion.

The approach just described is considered optimal under typical conditions of an additive white Gaussian noise channel. However, the computational burden is very high, and, may be prohibitive for a small, battery-powered digital signal processor (DSP).

A principal purpose of this invention is to provide an alternative transmission/acquisition signal, which is robust in the presence of range rate, and which is combined with a secondary signal to identify the range rate where the combination of the two is used for purposes of both temporal and spectral alignment.

Another purpose of this invention is to provide improved underwater acoustic modems that can conduct bi-directional communication while moving at high speeds relative to one another.

Other objects of the invention will, in part, be obvious and will, in part, appear hereinafter when the following detailed description is read in conjunction with the drawings.

SUMMARY OF THE INVENTION

An underwater communications method is provided for demodulating communications signals while compensating for the effects of range rate, i.e., relative velocity between the nodes of the communication system. In one aspect, the method comprises the steps of generating a communication signal with an acquisition component for providing an initial estimate of the range rate. The acquisition component preferably is with a nonlinear frequency modulated acquisition component for providing the initial estimate of the range rate wherein the frequency of the nonlinear frequency modulated acquisition component varies in accordance with the expression $$\left(1 + \frac{v}{c}\right)f,$$

where v is the constant velocity between the transmitter and receiver, c is the velocity of propagation of sound in water, f is the frequency of modulation which varies from a first frequency to a last frequency, $f_1 \leq f \leq f_n$. More particularly, the nonlinear frequency modulated acquisition component is a hyperbolic frequency modulated signal.

Following this, a second set of signals is generated and acquired using the initial estimate of range rate to obtain a more precise estimate of range rate. The second set of signals is preferably a set of single frequency tonals.

The communication signal is then demodulated using the more precise estimate of range rate to compensate for the effects of range rate on the communication signal so that the communication signal appears to have not been influenced by the effects of range rate.

The method is implemented via software programmed on a conventional data signal processor (DSP) forming part of a well-known underwater bi-directional acoustic modem.

BRIEF DESCRIPTION OF THE DRAWINGS

The structure, operation, and methodology of the invention, together with other objects and advantages thereof, may best be understood by reading the detailed description in connection with the drawings in which each part has an assigned numeral that identifies it wherever it appears in the various drawings and wherein.

DETAILED DESCRIPTION

The present invention relates to a signal component for use in underwater communications via acoustic modem to provide acquisition and alignment of signals between transmission and receiving nodes that are rapidly moving (20 or more knots) with respect to one another. An example of such an underwater communications system is diagrammatically illustrated in FIG. 1 in which are illustrated a submarine 12 equipped with an underwater sonar modem including a transducer 14 for transmitting and receiving signals between various communications nodes in the system.

Figure 1:
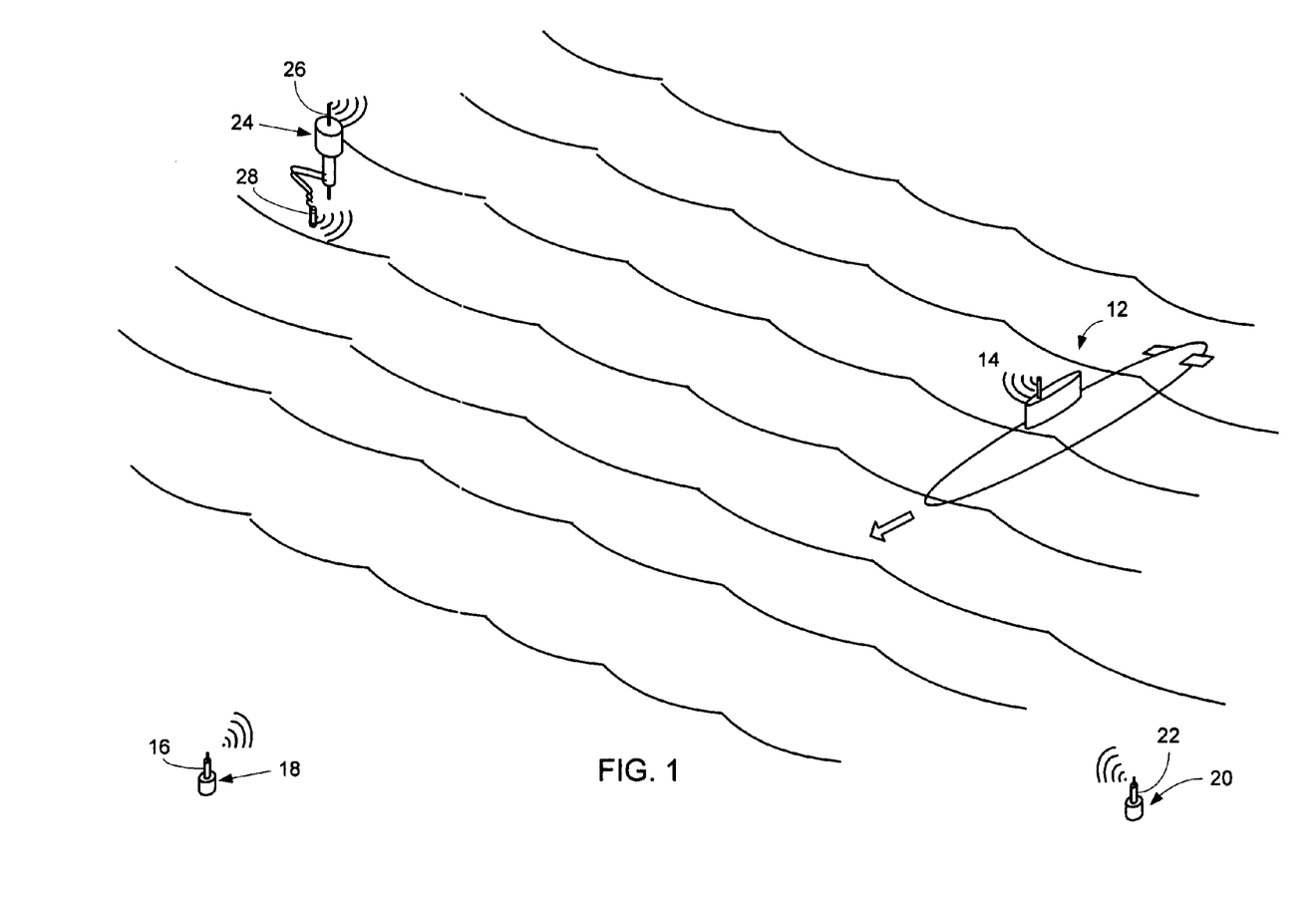
FIG. 1 is a diagrammatic perspective view of an underwater communications environment in which the communications nodes are moving relative to one another.

Included among the communications nodes are two subsea acoustic modems, 18 and 20, each of which is equipped with transducers 16 and 22, respectively, to serve as underwater component of a bi-directional acoustic communication network. The subsea modems may be interfaced with a host instrument, and acoustically transmit/receive data from the host to a topside acoustic modem 24.

At the surface is the topside telesonar modem 24 serves as the surface component of the bi-directional acoustic communication system. The surface modem 24 is configured with a remote dunking transducer 28 and an air resident vertically mounted transducer 26 for communications with surface vessels, aircraft, land or space based nodes and operates to transmit commands/data to, and receive commands/data from, the subsea acoustic modem(s) 18 and 20 located on a seafloor instrumentation package, the submarine 12 or AUV (not shown).

Figure 2:
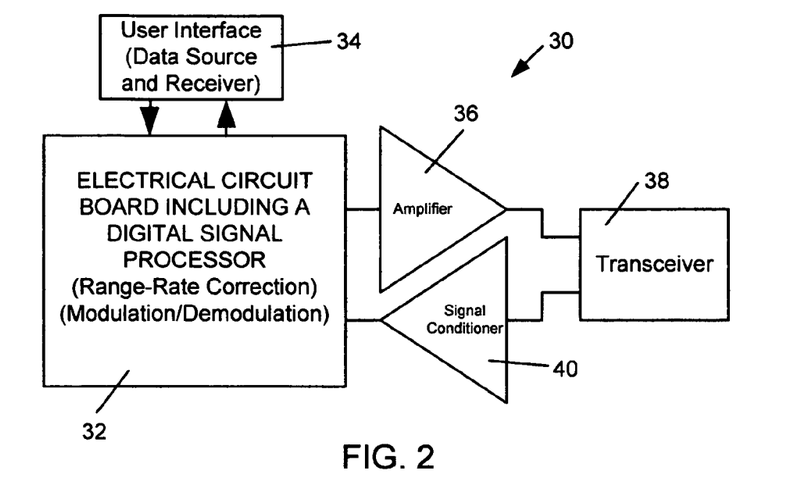
FIG. 2 is a block diagram of a modem in accordance with the invention.

The underwater modems are of a well-known type marketed by, for example, Benthos Corporation, North Falmouth, Mass. and are generally configured for bi-directional acoustic communication at data rates up to 2400 baud and provide ultra reliable data transmission in either a vertical or horizontal channel using MFSK modulation schemes, as well as data redundancy, convolutional coding, and multipath guard period ensure robust data transmission. The transducers may be remote or integral in configuration, and may be directional, omnidirectional, or be line array transducers for particular radiation patterns. Standard frequency bands: 9–14 kHz (LF), 16–21 kHz (MF), or 25–30 kHz (HF) may be employed depending on application requirements. All of the components may be under the control of surface based PC equipped with a graphic user interface (GUI) for ease of operation. FIG. 2 illustrates the general configuration of the modems where one is designated generally at 30. Modem 30 is seen to comprise an electrical circuit board configured in a well-known manner with a digital signal processor (DSP) for performing computational functions on incoming and outgoing communications signals in accordance with preprogrammed protocols, and to provide other system operational control. A user interface 34 is provided for feeding data, such as configuration instructions, to the DSP. Outgoing signals are modulated and amplified by an amplifier 36 after which they are passed to a transceiver 38. Transceiver 38 passes incoming signals to a signal conditioner 40 before they are passed to the DSP for demodulation.

The DSP is programmed with a high range rate correction program to permit underwater acoustic communications when the nodes of the communications systems are moving at high speeds with respect to one another.

Figure 3:
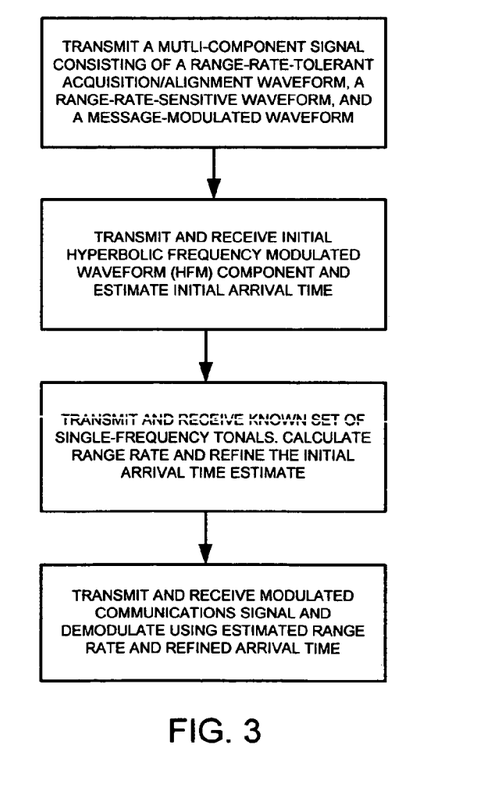
FIG. 3 is a high level flowchart of the method of the invention.

For initial signal acquisition, use of a hyperbolic frequency modulated (HFM) signal is made. Such signals have long been employed as sonar signals in anti-submarine warfare (ASW) situations. In this application, their ability to provide adequate detection performance in the presence of substantial range rate (relative speed) with the target submarine is well known. However, the peak arising from the matched filter process on the HFM experiences an unknown temporal offset which is a function of the range rate. This may or may not be of importance in ASW, but the misalignment is a serious problem in the communications context. Therefore, the HFM waveform is followed with a number of single-frequency tonals, all transmitted simultaneously. The number of tonals may be greater than or equal to one. Tonal signals are uniquely suited to producing a Doppler-shift, or spectral shift, which is a function of the range rate and the tonal frequency. Given the approximant alignment provided by the filtering of the HFM, we obtain a substantial portion of the tonals, and compute a power spectrum. The power spectrum is optimally based on a Fourier transform, although other transforms may be used. The tonals will produce peaks in the power spectrum. If these peaks are large enough, their spectral location is estimated and compared with the known transmitted frequency. The difference is the Doppler shift of the tones, from which we can calculate the relative velocity or range rate. The range rates estimated from each of the tonals is averaged to obtain one estimate. This procedure is generally outlined in the flowchart of FIG. 3.

The range rate estimation from the tonals is used for two purposes. First, via an algorithm described here, the alignment error imposed by range rate on the filtered HFM is corrected. Second, the compression/dilation of the modulated waveform is identified and is compensated for by conventional resampling methods which return the modulated signal to the form it would have had in the absence of range rate.

Two HFM waveforms are defined: the stored reference (used as a filter), and the transmitted signal. The latter is a subset of the former both in duration and frequency content. The duration of the reference waveform is $T_{ref}$, and the duration of the transmitted waveform is $T_{tx}$. The reference waveform sweeps from $F_{min}$ to $F_{max}$, in a manner to be described, while the transmitted waveform sweeps form $f_{min}$ to $f_{max}$.

The parameters for the transmitted waveform are derived from the anticipated maximum range rate $R_{max}$ as described below.

The replica hyperbolic FM is defined by an inverse relationship:

$$f=1/(slope*t+b) \quad (1)$$

with a solution $$x(t)=\exp(i2\pi(ln(slope*t+b)/slope-Fc*t)) \quad (2)$$

where b=1/Fmin, and where the slope is defined to be $$slope=(F_{min}-F_{max})/(T_{ref}*F_{max}*F_{min}), \quad (3)$$

with $Fc=(F_{max}+F_{min})/2$;

In Eq. 2, the subtracted factor $Fc*t$ acts as a basebanding function, moving the HFM down from passband at the same time it is generated. With this factor, x(t) may be generated directly at the baseband sample rate of fs samples/second. The signal is constrained so that the bands never exceed the allowable bandwidth of W Hz. Given the maximum range rate of $R_{max}$, we first compute the band edges for the transmit signal are first computed:

$$factor=1-1.68*R_{max}/sonic; \quad (4)$$

$$dumF=F_{min}*factor;$$

$$f_{min}=2*F_{min}-dumF; \text{ % Max low edge of } Tx \text{ signal}$$

$$factor=1+1.68*R_{max}/sonic;$$

$$dumF=F_{max}*factor;$$

$$f_{max}=2*F_{max}-dumF; \text{ % Max upper edge of } Tx \text{ Signal}$$

and the times t1 and t2 in the sweep of the signal which correspond to $f_{min}$ and $f_{max}$, respectively are computed as:

$$ts1=(1/f_{min}-1/F_{min})/slope; \quad (5)$$

$$ts2=(1/f_{max}-1/F_{max})/slope;$$

Because the transmitted signal is shorter than the replica, it needs to be positioned in the outgoing signal with a slight offset, so that the correlator (when no range rate is present), peaks at the correct time.

When the transmitted signal is correlated with the received signal, any compression/dilation of the waveform is reflected in a small loss in output SNR due to the extended parameters of the reference. It will also result in the correlator peak being offset from the nominal zero lag position. The offset may be defined theoretically by the relationship:

$$offset=-((f_{min}-1)./(F_{min}*(1+cf)))/(slope*f_{min})-((f_{min}-1)./(F_{min}*(1+cf)))/(slope*f_{min}) \quad (6)$$

where the compression factor is the ratio of range rate (v) to sound speed (sonic):

$$cf=v/sonic \quad (7)$$

When a peak is detected, it is not known that the received signal was perturbed by range rate. Therefore, the HFM is followed with a $T_{tona}l$ ms N-tone signal. This signal consists of N tonals, located at known locations within the transmitted signal band. The power spectrum of this signal is observed and the location of the peaks pertinent to each tone is estimated. The difference between the estimated location and the transmitted location provides data which is used to estimate range rate. Because the FFT used to evaluate the power spectrum may be coarse, it will be necessary to develop an appropriate estimator: let y1, y2, y3 be the power spectral energy in bins located at x1, x2, x3, centered on x2 (y2 is greatest). A quadratic curve is fit to these points, with results:

$$A=(y(1)-2*y(2)+y(3))/2; \quad (8)$$

$$C=y(2);$$

$$B=y(3)-y(2)-A;$$

$$X=-B/(2*A);$$

$$Y=A*X^2+B*X+C;$$

$$X=(x1(2)+X);$$

with X being the desired estimate of bin location, and y2 being the spectral power at X. If B is the FFT bin width in Hertz, the difference between (X−1)*B and the transmitted frequency $F_k$ is $\Delta f_k$, k=0 . . . N.

With the frequency offset estimate $\Delta f_k$ available, the range rate is estimated as $$RR_k=sonic*\Delta f_k/(1.68*F_k) \quad (9)$$

We compute the average RR over $RR_k$ to obtain our estimate of range rate. Given the range rate, the compression factor is calculated as follows:

$$cf=RR*1.68/sonic; (RR \text{ in knots})$$

Alternatively, we can normalize the frequency shift to fc as follows:

$$\Delta f_c=\Delta f_k*f_c/(f_{c+}(f_c-f_k))$$

We then calculate the mean of $\Delta f_c$. Given the average $\Delta f_{cavg}$, the compression factor is calculated as follows:

$$cf = \Delta f_{cavg}/f_c$$

Given the compression factor, the correction to the temporal offset inherent in the matched filter output is estimated as $$\text{offset} = -fs*((f_{min}-1)./(F_{min}*(1+cf)))/(\text{slope}*f_{min}) - ((f_{min}-1)./(F_{min}*(1+cf)))/(\text{slope}*f_{min})$$

The result "offset" is presented in temporal samples.

Figure 4:
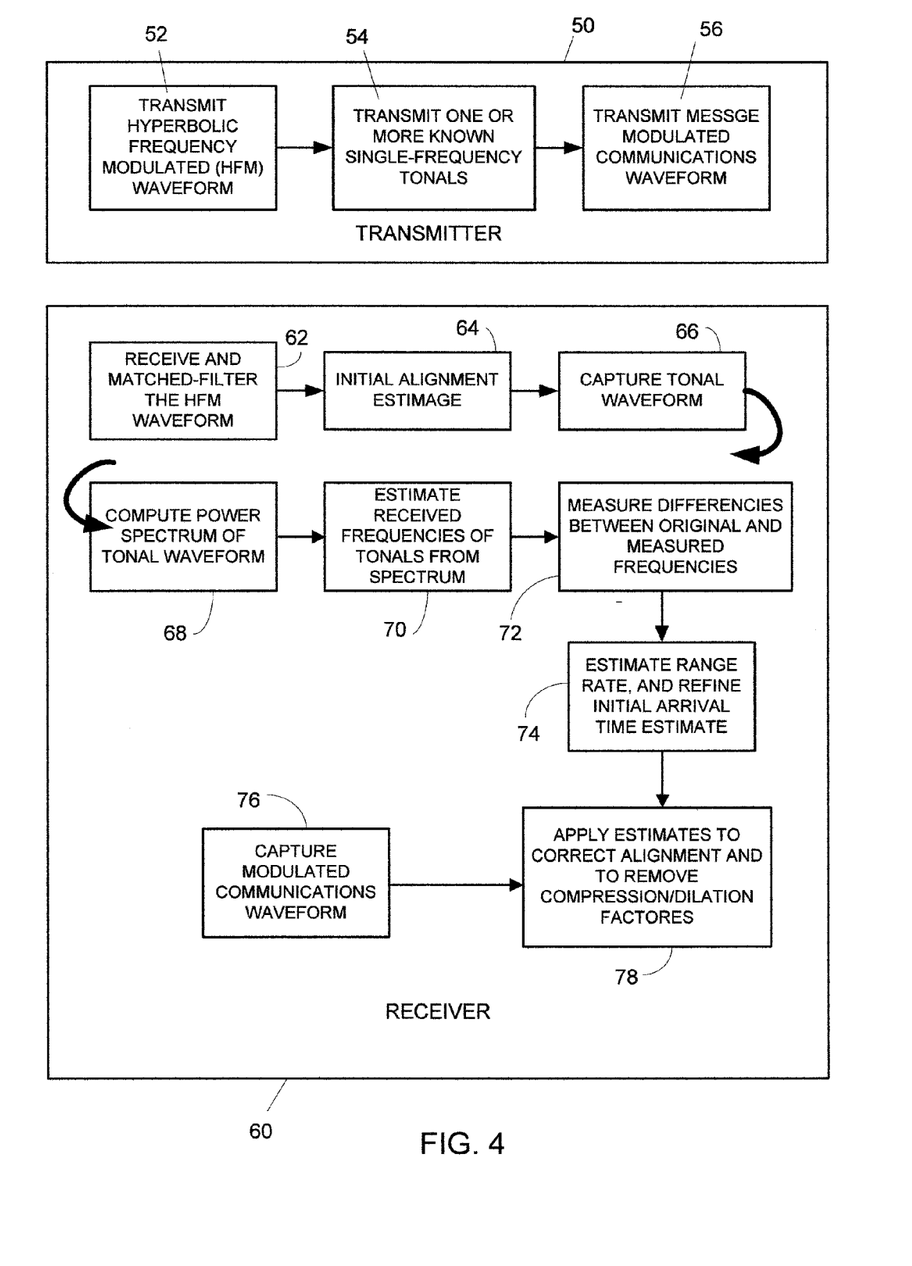
FIG. 4 is a block diagram of a transmitter and receiver of the invention.

This foregoing procedure is implemented by way of the transmitter and receiver shown, respectively, as 50 and 60 in FIG. 4. As shown in block 52, a hyperbolic frequency modulated waveform (HFM) is first transmitted. Following this, one or more single frequencies tonals are transmitted as shown in block 54. Afterwards, a message modulated communications waveform is transmitted as shown in block 56.

At receiver 60, the signals from the transmitter 50 are first received and the HFM is match filtered as shown in block 62. Following this, an initial alignment estimate is made as in block 64. Then the tonal waveform is captured in block 66. The power spectrum of the tonal waveform is then computed in block 68. From the power spectrum of the tonals, the received frequencies are then estimated in block 70. Then in block 72, the differences between the original and measured frequencies are measured. In block 74, an estimate of the range rate is made and the initial arrival time estimate is refined. In block 76, the modulated communications waveform are captured, and estimates to correct alignment and to remove compression/dialation factors are applied.

Figure 5:
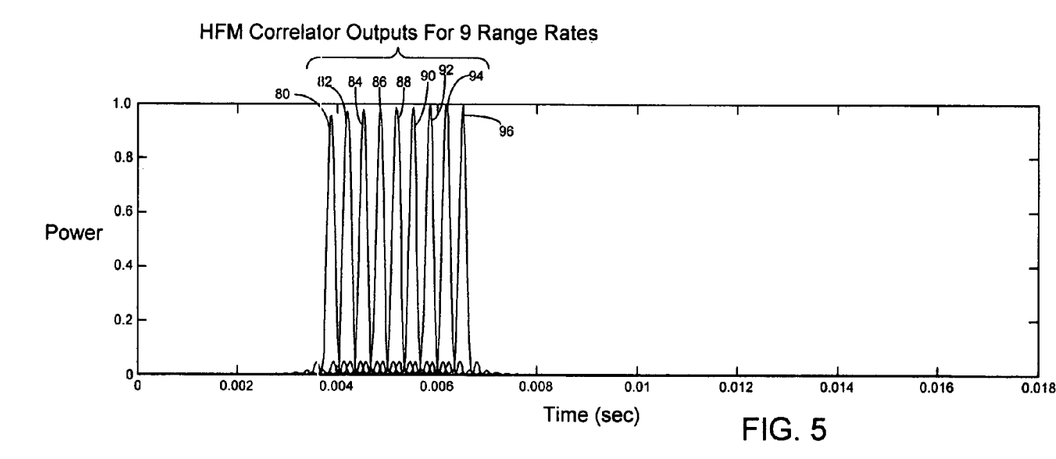
FIG. 5 is a graph of the output of the correlation for one reference signal and nine examples of range rate spanning −20 to +20 kts.
Figure 6:
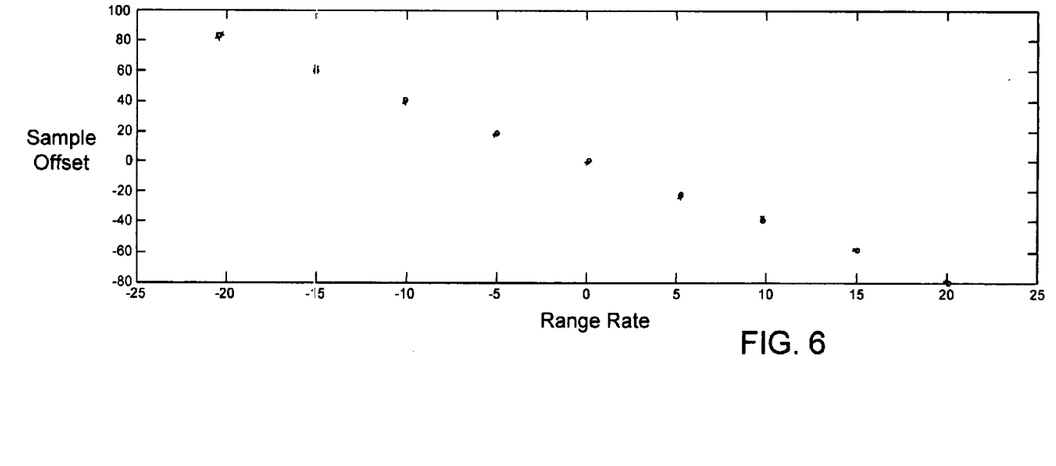
FIG. 6 is a graph showing by the "x" the number of temporal samples by which a peak is offset from the zero-range-rate peak.

FIG. 5 shows, the output of the correlation for one reference signal and nine examples (curves 80 through 96) of range rate spanning −20 to +20 kts. (higher relative speeds, such as +/−30 knots or higher are possible). All signals "arrived" at the same time, but the correlation process introduced the apparent offsets. FIG. 6 shows by the "x" the number of temporal samples by which a peak is offset from the zero-range-rate peak. The "o" is the theoretical measurement (Eq (6)), when multiplied by fs, while the "+" shows the offset estimated from the CW tones. This agreement shows the alignment offset caused by using the extended reference HFM can be corrected, given the tri-tones to estimate frequency offset. Note that the frequency offset may also be used to set the resampling of the modulated packet, thereby removing the effects of range rate.

It should be noted that the tri-tones may not behave as well as shown here. Should there be frequency-dependent fading, it will be necessary to ignore a faded tone. This can only be done if the local noise floor is known. That is, one should estimate the residual mean (M) and sigma (S) of the power spectrum, and set a threshold at a level of approximately Thresh=M+20*S. Lines greater than Thresh may be included in the calculation.

An example of Matlab Code for implementing the high range rate correction protocol is as follows:

```
%HFM_test a routine to test the ability of an HFM to overcome range rate,
%and to predict the temporal offset in matched filter output induced by
%range rate. This routine generates one replica for storage, then
%truncates the same signal for transmission. It does not support the
discussion above
%concerning use of CW tones to correct HFM offset.
clear
clf
fs=10240
sonic=5000; %Use your standard sonic speed
%replica
Tref=0.05; %Basic modem acquisition signal duration
fmin=16000; %lower band edge
fmax=21120; %upper band edge
Fc=(fmax+fmin)/2; %carrier
rrmax=20; %maximum velocity in kts
%build the replica HFM at baseband
slope=(fmin-fmax)/(Tref*fmax*fmin);
dt=1/fs;
tr=0:dt:Tref-dt;
ref=exp(i*2*pi*((log(slope*tr+1/fmin)/slope)-Fc*tr));
%compute Tx signal at baseband
factor=1-1.68*rrmax/sonic;
dumF=fmin*factor;
f1=2*fmin-dumF; %Max low edge of Tx signal
factor=1+1.68*rrmax/sonic;
dumF=fmax*factor;
f2=2*fmax-dumF; %Max upper edge of Tx Signal
%find start and stop times of Tx signal corresponding to f1 & f2
dt=1/fs;
ts1=(1/f1 -1/fmin)/slope;
ts2=(1/f2 -1/fmin)/slope;
Tstart=round(ts1/dt)-1;
Tstop=round(ts2/dt)-1;
signal=ref(Tstart:Tstop); %Tx signal
extra=round((Tref-Tstop*dt)*fs);
%following signal is exactly as long as is the reference signal, so
%correlation peaks at the same point in time
signal=[zeros(1,Tstart-1),signal,zeros(1,extra)];
ts=0:dt:(length(signal)-1)*dt:
%analysis
figure(1)
clf
nfft=2^ceil(log(length(ref))/log(2));
ff=fs/nfft;
f=0:ff:(nfft-1)*ff;
Rrb=abs(fft(ref,nfft)).^2;
Rsb=abs(fft(signal,nfft)).^2;
subplot(2,1,1),plot(f,Rrb)
hold on
plot(f,Rsb,'g');
hold off
z1=abs(cconvolv(ref,[zeros(1,100),ref],1)).^2;
z2=abs(cconvolv(ref,[zeros(1,100),signal],1)).^2;
subplot(2,1,2),plot(z1)
hold on
plot(z2,'g')
hold off
%add range rate
delr=rrmax/5;
rr=-rrmax:delr:rrmax;
lrr=length(rr);
z=zeros(2*length(signal),lrr);
for k=1:lrr,
    factor=(1+rr(k)*1.68/sonic);
    x=dilation(factor,fs,signal,Fc);
    zz=abs(cconvolv(ref,[zeros(500,1);x(:)],1)).^2;
    z(1:length(zz),k)=zz(:);
end
center=fix(lrr/2)+1;
[dum,iz1]=max(z(:,center));
figure(2)
clf
subplot(2,1,1),plot(z(450:550,:))
offset=zeros(lrr,1);
measured=offset;
min_measure=- ((f1-1)./((fmin)))/(slope*f1);
for k=1:lrr,
    factor=(1+rr(k)*1.68/sonic);
    offset(k)=fix((- ((f1-1)./((fmin)*(factor)))/(slope*f1)-min_measure)*fs);
    [dum iz]=max(z(:,k));
    measured(k)=iz1-iz;
end
subplot(2,1,2),plot(offset,'o')
hold on
plot(measured,'+g')
hold off
```

Having described the invention with reference to particular embodiments, other variations will occur to those skilled in the art based on its teachings, and it is intended that all such variants be within the scope of the invention as defined by the appended claims.

What is claimed is:

1. An underwater communications method for modulating and demodulating communications signals while compensating for the effects of range rate, said method comprising the steps of:

generating a communication signal with a nonlinear frequency modulated acquisition component for providing an initial estimate of the range rate, wherein said nonlinear frequency modulated acquisition component is a hyperbolic frequency modulated signal the frequency of which varies in accordance with the expression $$\left(1 + \frac{v}{c}\right)f,$$

where v is the constant velocity between the transmitter and receiver, c is the velocity of propagation of sound in water, f is the frequency of modulation which varies from a first frequency to a last frequency, $f_1 \leq f \leq f_n$;

generating a set of single-frequency tonals and acquiring them using said initial estimate of range rate to obtain a more precise estimate of range rate; and demodulating said communication signal using said more precise estimate of range rate to compensate for the effects of range rate to make said communication signal appear as though range rate effects were not present in said communication signal.

2. An underwater communications method for determining and correcting communications signals for the effects of range rate, said method comprising the steps of:

generating a modulated communication signal having an initial acquisition component in the form of a hyperbolic frequency modulated (HFM) waveform;

detecting and filtering said HFM waveform with a matched filtering process to provide an initial estimate of alignment in the presence of substantial range rate;

following said HFM waveform with a number of simultaneously transmitted single-frequency tonals;

obtaining a substantial portion of said tonals using said initial estimate of alignment from filtering said HFM waveform and computing a power spectrum in which said tonals have peaks;

estimating the spectral location of said tonal peaks and comparing them with the known transmitted frequencies of said tonals to obtain the differences between them, said differences representing the Doppler shift of said tones;

calculating a range rate for each of said tonals;

averaging said tonal range rates to obtain one estimate of range rate;

correcting said initial estimate of alignment with the averaged range rate to obtain a corrected alignment; and identifying the compression/dilation of said modulated communication signal with said corrected alignment and compensating for it by resampling to return said modulated communication signal to the form it would have had in the absence of range rate.

3. An underwater communications method for determining and correcting communications signals for the effects of range rate, said method comprising the steps of:

generating a modulated communication signal having an initial acquisition component in the form of a hyperbolic frequency modulated (HFM) waveform;

detecting and filtering said HFM waveform with a matched filtering process to provide an initial estimate of alignment in the presence of substantial range rate, said matched filtering process on said HFM waveform experiencing an unknown temporal offset which is a function of range rate;

following said HFM waveform with a number of single-frequency tonals, all transmitted simultaneously;

obtaining a substantial portion of said tonals with said initial estimate of alignment from filtering said HFM waveform and computing a power spectrum based on a predetermined transform such that said tonals have peaks in said power spectrum;

estimating the spectral location of said tonal peaks and comparing them with the known transmitted frequencies of said tonals to obtain the differences between them, said differences representing the Doppler shift of said tones;

calculating the relative velocity or range rate for each of said tonals;

averaging said range rates estimated from each of said tonals to obtain one estimate of range rate;

correcting for the initial alignment error imposed by the averaged range rate on the filtered HFM waveform; and identifying the compression/dilation of said modulated communication signal and compensating for it by conventional resampling methods to return said modulated communication signal to the form it would have had in the absence of range rate.

4. An underwater acoustic communications modem for modulating and demodulating communications signals while compensating for the effects of range rate, said modem comprising:

means for generating a communication signal with a nonlinear frequency modulated acquisition component for providing an initial estimate of the range rate, wherein said nonlinear frequency modulated acquisition component is a hyperbolic frequency modulated signal the frequency of which varies in accordance with the expression $$\left(1 + \frac{v}{c}\right)f,$$

where v is the constant velocity between the transmitter and receiver, c is the velocity of propagation of sound in water, f is the frequency of modulation which varies from a first frequency to a last frequency, $f_1 \leq f \leq f_n$;

means for generating a set of single-frequency tonals and acquiring them using said initial estimate of range rate to obtain a more precise estimate of range rate; and means for demodulating said communication signal using said more precise estimate of range rate to compensate for the effects of range rate to make said communication signal appear as though range rate effects were not present in said communication signal.

5. An underwater acoustic communications modem for determining and correcting communications signals for the effects of range rate, said modem comprising:

transceiver means for creating and receiving acoustic signals;

electronic means including a digital signal processor (DSP) electrically coupled to said transceiver means and programmed to:

generate a modulated communication signal having an initial acquisition component in the form of a hyperbolic frequency modulated (HFM) waveform;

detect and filter said HFM waveform with a matched filtering process to provide an initial estimate of alignment in the presence of substantial range rate;

follow said HFM waveform with a number of simultaneously transmitted single-frequency tonals;

obtain a substantial portion of said tonals using said initial estimate of alignment from filtering said HFM waveform and computing a power spectrum in which said tonals have peaks;

estimate the spectral location of said tonal peaks and comparing them with the known transmitted frequencies of said tonals to obtain the differences between them, said differences representing the Doppler shift of said tones;

calculate a range rate for each of said tonals;

average said tonal range rates to obtain one estimate of range rate;

correct said initial estimate of alignment with the averaged range rate to obtain a corrected alignment; and identify the compression/dilation of said modulated communication signal with said corrected alignment and compensating for it by resampling to return said modulated communication signal to the form it would have had in the absence of range rate.

* * * * *